(12) United States Patent
Bennett et al.

(10) Patent No.: US 6,372,164 B1
(45) Date of Patent: Apr. 16, 2002

(54) METHOD AND APPARATUS FOR APPLYING A COLORANT TO A THERMOPLASTIC TO PRODUCE A VISUAL EFFECT

(75) Inventors: James H. Bennett, Livonia; Steve Wasson, Middleville; Gary Kogowski, Farmington Hills, all of MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/320,056

(22) Filed: May 26, 1999

Related U.S. Application Data

(63) Continuation-in-part of application No. 08/975,020, filed on Nov. 20, 1997, now abandoned.

(51) Int. Cl.⁷ .............................. B05D 3/12; B05D 5/06; B29C 47/04; B32B 31/30; B32B 33/00
(52) U.S. Cl. ..................... 264/74; 156/244.27; 264/131; 264/171.13; 264/171.23; 264/171.24; 264/211.12; 427/180; 427/359
(58) Field of Search ..................... 264/74, 131, 171.13, 264/171.23, 171.24, 211.12; 156/244.27; 427/180, 359

(56) References Cited

U.S. PATENT DOCUMENTS 5,670,237 A * 9/1997 Shultz et al.

* cited by examiner

*Primary Examiner*—Leo B. Tentoni
(74) *Attorney, Agent, or Firm*—Fernando Borrego; Mary K. Cameron

(57) ABSTRACT

A visual effect, such as a granite-look, is produced in a thermoplastic product by directly applying a sufficient amount of at least one color-containing thermoplastic resin system to the surface of an extruded sheet of a thermoplastic resin. The color-containing thermoplastic resin system is applied onto the extruded sheet after it emerges from the die and prior to it entering the rollstack.

14 Claims, 2 Drawing Sheets

METHOD AND APPARATUS FOR APPLYING A COLORANT TO A THERMOPLASTIC TO PRODUCE A VISUAL EFFECT

This is a continuation in part of application of U.S. Ser. No. 08/975,020 filed Nov. 20, 1997, now abandoned.

FIELD OF THE INVENTION

The present invention relates to methods and apparatuses for producing visual and other surface effects in a finished thermoplastic product by directly applying at least one color-containing thermoplastic resin system to at least one surface of an extruded thermoplastic substrate. The present invention also relates to the finished articles.

BACKGROUND OF THE INVENTION

In the thermoplastic molding industry, the color and surface aesthetics of the final molded product dramatically influences the end user's view of that product and, in turn, these ultimately dictate how well it will sell. The ability to provide unique or enhanced colors or other surface aesthetics can dramatically increase both the variety of applications for which such a thermoplastic will be accepted and also allows the molded product to be distinguished from its competition.

Some of the more desirable conventional visual effects are typically known as graining, mottling, blotching, marbling, streaking and variegation. One highly desirable aesthetic appearance for thermoplastic sheet materials is that of natural granite. This particular visual effect has been generally referred to in the art as either "granite-look" or "granite-like."

Granite-look and other surface effects have typically been generated in the thermoplastic art by incorporating some form of additive into the thermoplastic resin system prior to molding or extrusion. Such methods exhibit several significant drawbacks.

While granite-look articles have been extremely desirable, previous methods for preparation of granite-look thermoplastic products have typically employed large diameter pigments or large agglomerations of smaller pigments within the molded resin itself. The loaded resin is then processed in such a manner that these pigments or pigment agglomerates are visible. Because most commercially-available pigments are of very small size, preparation of large particle sizes or agglomerates is difficult and expensive. Further, controlling particle size during currently used methods for manufacture, specifically, compounding by extrusion or casting, is problematic.

It will also be appreciated by the skilled artisan that virtually any additive that is placed in a thermoplastic resin system primarily to generate an aesthetic effect will compromise the physical properties of the finished product. Particularly, when dealing with opaque thermoplastics, both the nature and quantity of materials employed in the art to produce these aesthetic effects have caused significant decreases in important physical properties, such as impact strength and weatherability. Further, the nature and quantity of the materials previously employed in the art (once again, especially in opaque thermoplastics) have also created some significant processing problems; when sufficient amounts of certain additives are employed in order to generate a granite-like appearance in a conventional opaque thermoplastic resin system, these same materials create flow instabilities that can dramatically narrow or shift the process window.

One current method of producing granite-look engineering thermoplastics is to load the thermoplastic resin with a high temperature material such as a thermoset. While loading a thermoplastic resin with a high temperature material can produce desirable visual effects, the loading level that is needed to provide the desired surface effect results in both adverse changes to the process window and also a final product that is far too brittle for most applications.

Another art-disclosed example of producing granite-look engineering thermoplastics employs an additive mixture containing: chopped nylon (or polyester fibers) of the desired colors; titanium dioxide; and a metallic soap dispersant. (See U.S. Pat. No. 5,407,988, issued Apr. 18, 1996 to Gary J. Kogowski, incorporated herein by reference.) This mixture is admixed with a thermoplastic resin system prior to extrusion or injection molding. The fibers coalesce during processing to form specks within the thermoplastic matrix and generate an improved granite-like appearance. Further, in employing this system, no fibers are typically detected in the finished product after extrusion or injected molding. However, there is a limitation on the amount of such an additive mixture that can be employed without the processing window being narrowed and/or an associated reduction in important physical properties.

Because employing such additives in injection or extrusion molding resin systems have such a negative impact on both processing and physical properties, the art has also employed casting-type molding. While casting addresses some of the processing concerns discussed above, it does not eliminate them all together. Other art-disclosed ways of generating such surface aesthetics on thermoplastics include, for example, molding-in surface texture (alone or in combination with incorporating additives to the base resin prior to molding as discussed above). Another method involves flexo or gravure printing of the desired image or aesthetic on a thin film and then laminating the thin film to the sheet thermoplastic material. While printing and photographing such patterns result in accurate reproductions of the desired effect, this process suffers from the significant drawback of having the overall physical properties of the printed film typically being the controlling factor in the scope of applications. Further, the width of films that can be effectively used as a substrate for such methods is limited.

The present invention overcomes many of these disadvantages by directly applying at least one compatible color-containing thermoplastic resin system to at least one surface of a thermoplastic after molding or extrusion, thus achieving a visual effect, such as a granite-look, while avoiding or minimizing any adverse effects on the physical properties or processing of the thermoplastic typically associated with art-disclosed methods.

SUMMARY OF THE INVENTION

It is an object of the present invention to simply and efficiently produce a granite-like or other surface effect on an extruded thermoplastic sheet product by directly applying a compatible color-containing thermoplastic resin system to at least one visible surface of the extruded thermoplastic sheet. A compressive force is then applied to the treated surface. Especially useful resin systems for use as the treated substrate in the present invention include styrenic copolymers such as acrylonitrile-styrene-acrylate and acrylonitrile-butadiene-styrene. The methods of the present invention achieve highly desirable visual effects, particularly a granite-like appearance, while minimizing any adverse effects on processing or physical properties, especially impact strength. The desired surface effect is achieved by the interaction of the color-containing thermoplastic resin system and the extruded thermoplastic sheet, without the necessity of using an embossing mechanism, as is common to prior art surface effect thermoplastics which rely on a difference in the concentration of pigment between embossed and non-embossed areas to achieve the desired effect.

It is another object of the present invention to provide both an apparatus for carrying out such methods and the articles produced thereby.

DETAILED DESCRIPTION

Figure 1:
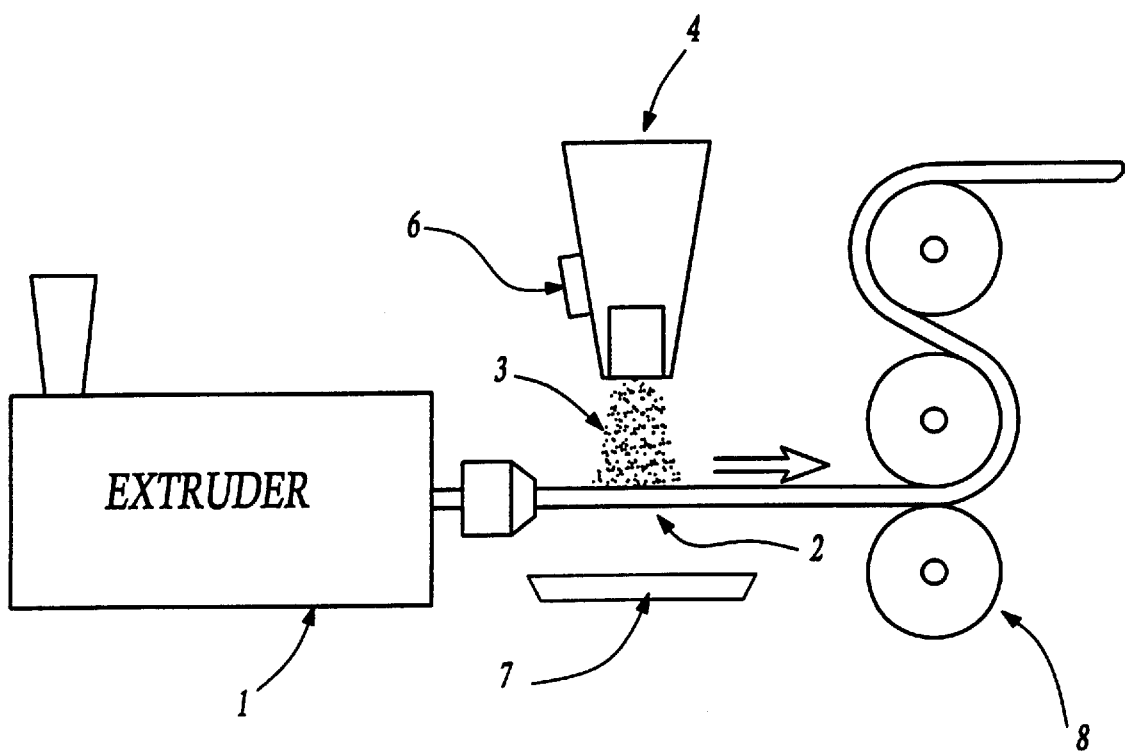
FIG. 1 is a diagrammatic illustration of an apparatus of the present invention for directly applying a colorant onto the surface of an extruded sheet of a thermoplastic, in accordance with one aspect of the present invention.

The methods and apparatuses of the present invention produce a granite-like appearance or other visual or textural effect on the surface of a sheet-like molded thermoplastic product. The method is carried out by first extruding or otherwise molding at least one thermoplastic in sheet form. Next, a color-containing thermoplastic resin system that is compatible with at least part of the extruded thermoplastic surface is used to treat at least one visible surface, preferably by direct application. A compressive force is then applied to the treated surface. The surface of the extruded thermoplastic is preferably maintained at a temperature sufficient to allow the color-containing system to react with, bond with or otherwise adhere to the surface of the treated thermoplastic substrate to achieve the desired visual or textural effect. No embossing mechanism is used in the method of the invention. In one embodiment, the color-containing system is preferably maintained at a temperature at or near the softening point of the thermoplastic it employs.

The advantages associated with this surface treatment of thermoplastic include the fact that the physical properties (e.g., impact strength; modulus of elasticity; weatherability; etc.) of the final product are not negatively effected. Further, the methods of the present invention avoid the processing problems commonly associated with methods where the additives that produce the aesthetic surface effect are added to the substrate resin system prior to processing. Additional advantages are the reduction in manufacturing costs and the ease of production.

The overall quality of the desired effect is also improved. In this regard, because the processes and methods of the present invention provide for surface treatment of the molding, they are continuous in nature: the treatment of the surface can be continuously monitored and dynamically adjusted on an ongoing basis, in contrast to static prior art methods that required addition prior to molding.

By the terms "granite-look" and "granite-like," as used herein to describe the surface of a thermoplastic, is meant that at least one final visible surface of the thermoplastic sheet material so described possesses an appearance that mimics, simulates, or otherwise conjures up that of naturally occurring granite.

By the terms "color-containing thermoplastic resin system" and "color-containing system" as used herein is meant a system that comprises at least two elements: (1) at least one pigment or dye; and (2) at least one thermoplastic material, preferably one that is compatible with a substrate thermoplastic resin. Other compounds, materials or agents may be employed in this system as well, especially those conventionally used in coloring thermoplastic resins or in formulating color concentrates. By way of example (but without any suggestion of limitation) the color-containing thermoplastic resin systems useful in the present invention may additionally employ a plurality of organic or inorganic pigments, dyes, or mixtures thereof. These may be incorporated into the thermoplastic resin as conventional dry or liquid color concentrates, superconcentrates, or precolored resin systems.

The thermoplastic material employed in the color-containing system may be any thermoplastic material, but preferably includes a resin that is compatible with at least one of the thermoplastics employed in the substrate to be treated. By "compatible," as that term is used herein to describe the thermoplastic material employed in the color-containing system, is meant that the thermoplastic will, under the processing conditions employed, substantially bond with, react with, or otherwise adhere to the treated thermoplastic surface. Without intending to be bound by theory, this reaction, binding or other adherence can be mechanical, physical, chemical, or any combination thereof. Such compatibility is typically characterized as both a chemical bond (with little or no crosslinking), hydrogen bonding, and/or mechanical retention. By way of a nonlimiting example, when the substrate surface to be treated comprises acrylonitrile-styrene-acrylate (ASA) materials, ASA or styrene-acrylonitrile would be preferred thermoplastic materials for use in the color-containing system. Other non-limiting examples are discussed below.

The color-containing system may also include one or more of the additives conventionally employed in color concentrates, superconcentrates, liquid colors, precolored resins, dry colors, or thermoplastic molding resin systems in general. Examples of such additives include, without limitation, antistatic agents, heat stabilizers, waxes, plasticizers, antioxidants, carbon blacks or other conductive agents, flame retardants, light stabilizers, ultraviolet stabilizers, meta-stable compounds, viscosity modifiers, antidusting agents, and the like.

As discussed above, the thermoplastic materials in the color-containing systems of the present invention are preferably compatible with the thermoplastics used to mold or extrude the substrate to be treated with the color-containing system. It will be appreciated that the preferred candidates are thermoplastics that are the same, or nearly the same, as those employed in an unblended substrate. For blended substrates, the following factors are important: (1) chemical comparability between the thermoplastic materials in the color-containing system and the thermoplastics used to mold or extrude the substrate to be treated with the color-containing system; and (2) similar softening or processing temperatures between the thermoplastic materials in the color-containing system and the thermoplastics used to mold or extrude the substrate to be treated with the color-containing system.

Examples of typical thermoplastic resins to be employed in color-containing systems include those thermoplastics generally referred to as engineering thermoplastics. Examples of engineering thermoplastics include polyacetals; polystyrenes, including high-impact polystyrenes and styrenic copolymers such as acrylonitrile-styrene-acrylate (ASA), acrylonitrile-butadiene-styrene (ABS), styrene-acrylonitriles (SAN), and styrene-maleic anhydrides (SMA); polyamides (nylons); polycarbonates; polyesters such as polyethylene terephthalates and polybutylene terephthalates; polyolefins such as polyethylene and polypropylene homopolymers and copolymers; polyurethanes; polyvinyl chlorides; acrylics; and mixtures thereof.

Examples of preferred material are as follows. For an ASA substrate, an ASA or SAN thermoplastic is preferred as the thermoplastic material in the color-containing system. For an ASA/ABS substrate, an ASA or SAN thermoplastic is also preferred as the thermoplastic material in the color-containing system. For an ABS substrate, an ABS, ASA, or SAN thermoplastic is preferred as the thermoplastic material in the color-containing system.

The types of thermoplastics that are particularly useful to produce the molded or extruded sheets in the practice of the present invention are generally engineering thermoplastics that may be molded or formed into sheets by extrusion or other molding processes and apparatuses, either alone or as blends. Illustrative engineering thermoplastics include each of those engineering thermoplastics listed above as suitable for the thermoplastics for the color-containing systems. It will be appreciated by the skilled artisan that the selection of the thermoplastic that is to be molded into sheet form and then act as the substrate to be treated with the color-containing thermoplastic resin system will be influenced primarily by the end-use of the finished product. Important factors for selection of the thermoplastic material for the color-containing system include not only its compatibility with the thermoplastic selected for the substrate, as already discussed, but also, again the end-use of the finished product.

One commercially-available polyacetal useful in the practice of the present invention for treatment as the substrate is a material marketed under the trademark ULTRAFORM® (BASF Corporation, Mount Olive, N.J.). ULTRAFORM® brand material is a polyoxymethylene copolymer (POM) that exhibits an outstanding combination of strength, rigidity and toughness, extremely low water absorption, outstanding resilience, good dimensional stability, high fatigue strength, favorable tribological characteristics, and good chemical resistance.

Other commercially-available materials useful in the practice of the present invention for treatment as the substrate are polyamides marketed under the trademarks ULTRAMID®, ULTRAMID®A, ULTRAMID®B, ULTRAMID®C, and ULTRAMID®T (BASF Corporation, Mount Olive, N.J.). All of these polyamides exhibit good dimensional stability, good heat resistance, high tensile strength and stiffness, good toughness, excellent processability, excellent finish, and good chemical resistance.

One commercially-available polybutylene terephthalate useful in the practice of the present invention is ULTRADUR®B (BASF Corporation, Mount Olive, N.J.). ULTRADUR®B brand materials exhibit high rigidity and strength, high resistance to heat distortion, low water absorption, good dimensional stability, good dielectrical properties, good chemical resistance, good toughness even at low temperatures, and good outdoor weatherability and resistance to high-temperature aging.

The styrenic copolymers are particularly useful for treatment as the substrate in the practice of the present invention. Their usefulness is due to their excellent physical properties. For example, both ASA and AES possess excellent weatherability.

Styrenic copolymers are thermoplastics that are formed by the reaction of two or more different monomers, one of which is styrene. The most preferred type of styrenic copolymer which is acrylonitrile-styrene-acrylate (ASA) copolymer, which may be employed, alone or as a blend with ABS. ASA copolymers are well known commercial thermoplastics. ASA copolymers are random amorphous terpolymers produced either by a mass copolymerization process or by grafting styrene-acrylonitrile to an acrylic elastomer backbone. ASA copolymers are characterized as outdoor weatherable and UV-resistant products that provide an excellent combination of color stability and property retention after outdoor exposure. ASA copolymers have many uses, for example, in bath tubs, shower stalls, swimming pool steps, and spas. ASA copolymers can also be used in multilayer applications or in coextrusion applications.

In accordance with one highly-preferred embodiment of the present invention, the ASA copolymer employed is a material marketed under the trademark LURAN® S (BASF Corporation, Mount Olive, N.J.). LURAN® S brand material exhibits outstanding outdoor weatherability, excellent color retention, good impact resistance, great toughness and rigidity, good heat stability, and good chemical resistance. Additionally, LURAN® S brand ASA is available in a variety of colors. It will be appreciated that because the colored LURAN® S brand materials are not transparent, a granite-look appearance is most effectively achieved by modifying only a surface layer of the sheet.

Another styrenic copolymer useful in the substrate is styrene-acrylonitrile (SAN). One useful commercially-available styrene-acrylonitrile useful in the practice of the present invention is marketed under the trade name LURAN® (BASF Corporation, Mount Olive, N.J.). LURAN® brand material exhibits high clarity and gloss, rigidity and toughness, and excellent chemical resistance.

Additionally, styrenic copolymers employed in the present invention may be blended with other thermoplastics. One useful commercially-available acrylonitrile-styrene-acrylate blend useful in the practice of the present invention is an ASA marketed under the trademark LURAN® S 'C' (BASF Corporation, Mount Olive, N.J.). LURAN® S 'C' brand ASA is a blend of acrylonitrile-styrene-acrylate and polycarbonate. LURAN® S 'C' brand ASA exhibits high heat resistance, good impact resistance and dimensional stability, resistance to yellowing under heat and UV radiation, and outstanding resistance to high temperature aging.

Another important type of styrenic copolymer that may be employed in the substrate sheet is acrylonitrile-butadiene-styrene (ABS) copolymer. ABS plastics are typically two-phase systems. Styrene-acrylonitrile (SAN) forms the continuous matrix phase. The second phase is composed of dispersed polybutadiene particles, which have a layer of SAN grafted onto their surface. The layer of SAN at the interface makes the two phases compatible. ABS copolymers have many uses, for example, in refrigerator linings, machine housings, instrument panels, pipes, countertops, sinks, and bathtubs. ABS copolymers can also be used in multilayer applications, as well as coextrusion applications.

One useful commercially-available type of acrylonitrile-butadiene-styrene useful in the practice of the present invention is marketed under the trademark TERLURAN® (BASF Corporation, Mount Olive, N.J.). Another useful commercially-available type of acrylonitrile-butadiene-styrene useful in the practice of the present invention is an ABS material marketed under the trademark TERLUX®

(BASF Corporation, Mount Olive, N.J.). TERLUX® brand ABS is a blend of methyl methacrylate and acrylonitrile-butadiene-styrene that exhibits excellent transparency, toughness, good chemical resistance, and good stress cracking resistance.

Another type of useful styrenic copolymer is acrylonitrile-ethylene-styrene (AES) copolymer.

The types of thermoplastics that are particularly suitable for treatment as the substrate in the practice of the present invention include, without limitation: ASA copolymers; ABS copolymers; AES copolymers; polyvinyl chloride (PVC); blends of polycarbonate (PC)/ABS copolymers in the ratio of about 5:95 to about 95:5 weight percent of PC:ABS; blends of ABS copolymers/nylon in the ratio of about 5:95 to about 95:5 weight percent ABS:nylon; blends of PC/ASA copolymers in the ratio of about 5:95 to about 95:5 weight percent PC:ASA; blends of PVC/ASA copolymers in the ratio of about 20:80 to about 80:20 weight percent PVC:ASA; and blends of ASA copolymers/AES copolymers in the ratio of about 20:80 to about 80:20 weight percent ASA:AES. These thermoplastics and thermoplastic blends are preferred in part due to their excellent weatherability. Especially preferred for treatment as the substrate in the practice of the present invention are ASA copolymers.

Colorants have been previously used in conjunction with many thermoplastics in order to impart a visual effect, such as a granite-look, to the thermoplastic by incorporation directly into the base resin prior to molding, and these same colorants and materials may be employed in the practice of the present invention when preparing a color-containing thermoplastic resin system. Colorants are generally defined as substances used to impart to or augment color in a resin or other material and are conventionally classified as pigments and dyes. When employed in engineering thermoplastics, the colorants are typically added in the form of color concentrates that are introduced into the thermoplastic resin through, for example, compounding. Typical color concentrates include one or more thermoplastic resins, which are preferably compatible with the resin system to be colored (or its surface), and one or more pigments or dyes. In this sense, the thermoplastic resin acts as a binder or carrier for the pigment.

Art-disclosed color concentrates have taken the form of pellets, cubes, beads, wafers, powders or micro-beads. Color concentrates conventionally have a pigment loading of from about 10% by weight to about 80% by weight, and typically from about 30% by weight to about 60% by weight, based upon the weight of the color concentrate. Preferably, the color concentrates have employed a pigment loading of up to about 80% by weight, and preferably at least about 50% by weight. The dye or pigment concentration will vary depending upon the selection of dye or pigment and binder.

Alternatively, two or more colorants or color concentrates may be blended or dry mixed to obtain the desired color and applied as the color-containing system of the present invention. Color concentrates are readily available commercially from a number of companies, including ReedSpectrum (Holden, Mass.), Uniform Color Company (Holland, Mich.), Americhem, Inc. (Cuyahoga Falls, Ohio), and Holland Colors Americas Inc. (Richmond, Ind.).

Typically, a color concentrate is formed by thoroughly mixing the colorant or mixture of colorants with the thermoplastic material. The colorant-thermoplastic mixture is then formed, through molding, casting, or extrusion, into the desired shape and processed into a finished color concentrate.

In accordance with one highly preferred embodiment of the present invention, a color-containing thermoplastic resin system is applied directly onto at least one surface, preferably the top surface, of an extruded or otherwise shaped article, especially an extruded sheet, of thermoplastic resin after emerging from the die or mold and prior to entering a rollstack.

In a preferred embodiment of the present invention, the color-containing system preferably comprises at least one conventional color concentrate in the form of at least one pigment and at least one thermoplastic resin binder or carrier which is compatible with a thermoplastic resin comprising the surface of the extruded shape. More preferably, a colored styrenic copolymer, and most preferably a colored ASA copolymer (e.g., LURAN® S), is employed as the thermoplastic resin binder or carrier. The colorants employed in the color-containing system may be comprised of one or more different individual pigments or colors.

Additionally, it should be appreciated that the thermoplastic resin to be extruded may also be colored with one or more colorants.

The color-containing thermoplastic resin systems employed are preferably applied to the surface of the extruded sheet in the form of particles. The color-containing thermoplastic resin systems are preferably cooled (preferably with liquid nitrogen) to a temperature below about −70° C. and then ground to a desired particle size so as to maximize the surface area. A particular color-containing thermoplastic resin system in the form of particles may be mixed with color-containing thermoplastic resin systems of other colors or textures to produce a desired visual effect, color or shade. Preferably, the particle size of the ground colorant will range from about 5 microns to about 3000 microns. Expressed in terms of U.S. Standard mesh size, the particle size of the ground colorant will preferably range from about −6 to about +5000 U.S. Standard mesh size, more preferably from about −10 to about +5000 U.S. Standard mesh size, still more preferably from about −14 to about +5000 U.S. Standard mesh size, and most preferably from about −16 to about +5000 U.S. Standard mesh size. All of the ground colorant particles preferably have an average aspect ratio of about 1.7.

As noted above, and without being bound to a particular theory of the operation of the present invention, it is believed that the use of colored thermoplastic resins as color imparting particles improves the bonding of the color imparting particles to the surface of the extruded thermoplastic resin due to the similar chemical and physical properties of the color-containing thermoplastic resin system and the extruded thermoplastic resins.

The extrusion process, which converts plastic material into a particular form (such as a sheet), uses an extruder to melt thermoplastic pellets or powder and force the resulting melt through a die. The extruded shape comes out of the die at a continuous rate and is then cooled, typically by being transported through a rollstack. The cooled, extruded shape may then be transported through a set of finishing rolls for further processing.

In accordance with one embodiment of the present invention, the rollstack and the thermoplastic resin to be extruded are preferably set to slightly higher temperatures than normal operation to assure that the colorants, applied before the rollstack, soften and bond to the matrix of the extruded thermoplastic resin. Typically, the rollstack is set to a temperature in the range of about 150° F. to about 200° F. for normal operation with respect to ASA, ABS, or ASA/

ABS substrates. It will be appreciated by the skilled artisan that the typical temperature of the rollstack for normal operation will be dependent in part on the extruded thermoplastic resin, as well as the thermoplastic materials employed in the color-containing system. However, in accordance with one preferred embodiment of the present invention, the rollstack is preferably set to a temperature in the range of about 180° F. to about 210° F., particularly when the substrate to be extruded is an ASA, ABS, or ASA/ABS substrate. Again, it will be appreciated by the skilled artisan that the typical temperature of the rollstack for warmer than normal operation will be dependent in part on the extruded thermoplastic resin, as well as the thermoplastic materials employed in the color-containing system. Without being bound to a particular theory of the operation of the present invention, it is believed that the use of a slightly warmer than normal rollstack improves the bonding of the color-containing system to the surface of the extruded thermoplastic resin.

Typically, the thermoplastic resin to be extruded is maintained at a temperature in the range of about 430° F. to about 440° F. for normal operation. However, in accordance with one preferred embodiment of the present invention, the thermoplastic resin to be extruded is preferably maintained at a temperature in the range of about 440° F. to about 480° F. It will be appreciated that the maintenance temperature of the thermoplastic resin ill depend on the softening temperature of the particular thermoplastic or thermoplastic blend.

The color-containing system is generally maintained at a temperature in the range of room temperature (i.e., ambient temperature) to about 280° F. It is important in most embodiments that the color-containing thermoplastic resin system not be maintained at a temperature substantially above the softening temperature of the particular thermoplastic(s) employed, as this may cause the individual particles to agglomerate.

Although the present invention is primarily directed to producing a granite-look or granite-like appearance in thermoplastic products, it should be appreciated that the methods and apparatuses of the present invention are capable of producing numerous other visual effects in conjunction with various color combinations. For example, other visual effects that can be achieved include, without limitation, graining, mottling, blotching, marbling, streaking, and variegation.

The intensity of the granite visual effect is generally proportional to the amount of colorant that is placed on the surface of the sheet, as well as the randomness of the pattern in which the colorant is applied. It should be appreciated that the weight percentages of the extruded thermoplastic resin and the color-containing thermoplastic resin system in the finished product will vary due to the total sheet thickness and the intensity of the visual effect achieved.

Referring to FIG. 1, there is generally illustrated an apparatus for directly applying at least one color-containing system to the surface of an extruded sheet of thermoplastic resin, in accordance with one aspect of the present invention. The extruder 1 produces a substantially flat sheet of thermoplastic resin 2 (e.g., ASA copolymer). As the sheet of thermoplastic resin 2 exits the extruder 1, a plurality of colorant particles 3 are applied to a surface of the sheet of thermoplastic resin 2. In this illustration, the colorant particles 3 are being applied to the top surface of the sheet of thermoplastic resin 2. However, it should be appreciated that, if desired, color-containing system particles 3 may also be directly applied to the bottom surface of the sheet of thermoplastic resin 2.

The color-containing system application system includes any suitable receptacle and delivery system, such as a manifold 4, or a transfer sheet. Although one application system is illustrated in the Figure, multiple color-containing system application systems are contemplated and may be preferred for certain embodiments of the invention. The manifold 4 distributes the color-containing system over the surface of the sheet of thermoplastic resin 2, but the color-containing system particles 3 need not necessarily be evenly distributed. The color-containing system particles 3 are discharged from the manifold 4 through an opening 5. With respect to opening 5, a variable opening design may be employed. Additionally, an optional vibrator 6 may be employed to loosen any color-containing system particles 3 lodged in the manifold 4 or opening 5. With respect to the variable opening design mentioned above, opening 5 may include two sliding screens that have the same opening size. When the openings line up, the larger size color-containing system particles 3 will pass through along with the smaller ones. When the openings are not aligned, only the smaller sizes will pass through. By varying the frequency of the sliding screens, a more randomized visual effect can be obtained.

Optionally, a pan 7 (or any other suitable receptacle) under the sheet of thermoplastic resin 2 could catch overflow of the color-containing system particles 3 from the edge of the sheet of thermoplastic resin 2 for recycling back to the manifold 4.

Finally, a rollstack 8 with an upstack arrangement (in other words, the extruded sheet starting between the lower two rolls and going upward) assists in the adherence of the color-containing system to the top or finished surface of the sheet of thermoplastic resin 2. However, it is envisioned that any suitable rollstack arrangement may be used in accordance with the present invention, provided that a sufficient amount of at least one color-containing system adheres to the sheet of thermoplastic resin 2.

It should be appreciated that by applying the color-containing system particles 3 only to the surface of the sheet of thermoplastic resin 2, the negatives associated with placing additives in the system which is used to mold the resin 2 are minimized, as compared to adding higher melt particles throughout the sheet of thermoplastic resin 2 by putting the color-containing system through the extruder 1 with the thermoplastic resin 2.

Figure 2:
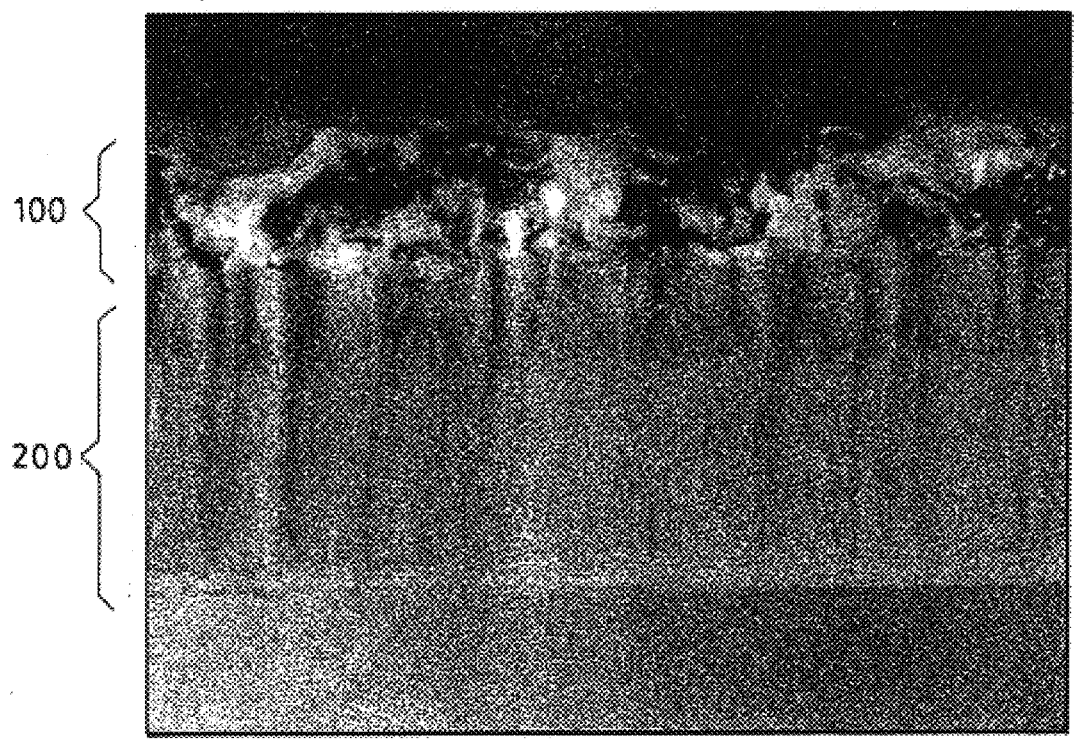
FIG. 2 is a photomicrograph of a cross-sectional view of an extruded sheet of a thermoplastic that has had a color-containing thermoplastic resin system directly applied onto the surface of the extruded sheet, in accordance with one aspect of the present invention.

In accordance with one embodiment of the present invention, a thermoplastic product is produced in which a cross-sectional view reveals a thermoplastic matrix wherein the surface portion, layer or zone of the matrix contains color-containing system and the remaining portion, layer or zone of the matrix is substantially free of the color-containing system. In other words, there are two distinct layers, zones, or phases visible. Referring to FIG. 2, a first phase 100, corresponding to the surface of the thermoplastic, contains a color-containing thermoplastic resin system and a second phase 200, corresponding to the rest of the thermoplastic matrix, is free of the color-containing thermoplastic resin system.

An example of a method for producing an article in accordance with one aspect of the present invention, is presented below:

EXAMPLE

A black color concentrate (11563-T1 Black) was obtained from Americhem (Cuyahoga Falls, Ohio), and was used as one component of the color-containing thermoplastic resin system. The 11563-T1 Black contained about 20–30 weight percent of carbon black in a SAN (styrene-acrylonitrile copolymer) binder. A colored LURAN® brand ASA copolymer, LURAN® S 797 SEUV White 00260 (BASF Corporation, Mount Olive, N.J.) was used as another component of the color-containing thermoplastic resin system. The LURAN® S brand LURAN® S 797 SEUV White 00260 pellets were used to provide a contrasting color. The 11563-T1 Black and the LURAN® S brand LURAN® S 797 SEUV White 00260 pellets were present in a 1:1 weight ratio. A LURAN® brand ASA copolymer, LURAN® S 797 SEUV Gray 33647 (BASF Corporation, Mount Olive, N.J.), was used as the base material, also referred to as the main resin component, of the sheet that was extruded. The pellets of black and white color concentrate were ground with a mill containing a 2.0 millimeter screen to obtain a desired size of color imparting particles, preferably in the range of 5 to 3000 microns. The color concentrate pellets were cooled with liquid nitrogen for easier grinding. The ground materials (black and white color imparting particles) were randomly mixed into a cup for distribution onto the surface of the LURAN® S brand LURAN® S 797 SEUV Gray 33647 thermoplastic resin as it emerged from the sheet die of an extruder. In order to promote bonding, the surface of the rollstack was set at about 190° F. and the temperature of the LURAN® S brand LURAN® S 797 SEUV Gray 33647 thermoplastic resin as it exited the die was set at 440° F. Without being bound to a particular theory of the operation of the present invention, it is believed that the black and white color imparting particles were appropriately bonded to the LURAN® S 797 SEUV Gray 33647 by softening prior to or in the nip area of the rollstack. The extruded sheet was then transported through the rollstack, cut, and processed into a finished article. The finished article was a uniformly flat sheet having a granite-look appearance on the top surface of the sheet. A cross-sectional view of the sheet revealed a thermoplastic matrix wherein the surface portion, layer or zone of the matrix contained the color-containing thermoplastic resin system and the remaining portion, layer or zone of the matrix was substantially free of the color-containing thermoplastic resin system. The finished article is expected to possess excellent weatherability based on the thermoplastic materials employed in both the base material and the color-containing thermoplastic resin system.

It should be appreciated that the rate at which the color imparting particles of the color-containing thermoplastic resin system are distributed onto the surface of the extruded thermoplastic resin is dependent in part on the intensity of the visual effect to be achieved. Typically, the faster the rate of distribution, the more intense the visual effect. Additionally, the intensity of the visual effect can be affected by altering or varying the speed at which the extruded thermoplastic resin exits the die of the extruder. However, it should be noted that the application of too much color-containing thermoplastic resin system onto the surface of the extruded thermoplastic resin can cause streaking on the surface due to accumulation at the rollstack.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A method for producing a molded thermoplastic product having an aesthetic effect, comprising the steps of:

extruding at least one thermoplastic in sheet form, said extruded thermoplastic having at least one visible surface;

providing a color-containing thermoplastic resin system comprising at least one thermoplastic resin that is compatible with said extruded thermoplastic;

applying said color-containing system to said visible surface of said extruded thermoplastic to produce a treated visible surface; and applying a compressive force to said treated visible surface of said extruded thermoplastic to form the molded thermoplastic product.

2. A method in accordance with claim 1, wherein said surface of said extruded thermoplastic is maintained at a temperature sufficient to allow said color-containing system to adhere or bond to said surface of said thermoplastic during said method.

3. A method in accordance with claim 1, wherein said compressive force is sufficient to promote adherence of said color-containing system to said surface of said extruded thermoplastic.

4. A method in accordance with claim 1, wherein said extruded thermoplastic is selected from the group consisting of polyacetals, acrylonitrile-styrene-acrylates, acrylonitrile-butadiene-styrenes, acrylonitrile-ethylene-styrenes, styrene-acrylonitriles, styrene-maleic anhydrides, nylons, polycarbonates, polybutylene terephthalates, polyethylenes, polypropylenes, polystyrenes, polyurethanes, polyvinyl chlorides, acrylics, and mixtures thereof.

5. A method in accordance with claim 1, wherein said extruded thermoplastic is selected from the group consisting of: acrylonitrile-styrene-acrylate copolymers; acrylonitrile-butadiene-styrene copolymers; acrylonitrile-ethylene-styrene copolymers; polyvinyl chloride; blends of polycarbonate and acrylonitrile-butadiene-styrene copolymers in the ratio of about 5:95 to about 95:5 weight percent; blends of acrylonitrile-butadiene-styrene copolymers and nylon in the ratio of about 5:95 to about 95:5 weight percent; blends of polycarbonate and acrylonitrile-styrene-acrylate copolymers in the ratio of about 5:95 to about 95:5 weight percent; blends of polyvinyl chloride and acrylonitrile-styrene-acrylate copolymers in the ratio of about 20:80 to about 80:20 weight percent; and blends of acrylonitrile-styrene-acrylate copolymers and acrylonitrile-ethylene-styrene copolymers in the ratio of about 20:80 to about 80:20 weight percent.

6. A method in accordance with claim 1, wherein said color-containing system is comprised of at least one pigment and at least one thermoplastic binder or carrier.

7. A method in accordance with claim 1, wherein said color-containing system is comprised of at least one dye and at least one thermoplastic binder or carrier.

8. A method in accordance with claim 1, wherein said compressive force is supplied by processing said extruded thermoplastic through at least one set of rolls.

9. A method in accordance with claim 1, wherein said extruded thermoplastic is maintained at a temperature in the range of about 440° F. to about 480° F. prior to the application of said color-containing system.

10. A method in accordance with claim 1, wherein said color-containing system is maintained at a temperature in the range of about ambient temperature to about 280° F. prior to application onto the surface of said extruded thermoplastic.

11. A method in accordance with claim 1, wherein said color-containing system comprises a plurality of particles.

12. A method in accordance with claim 6, wherein said binder is a thermoplastic selected from the group consisting of polyacetals, acrylonitrile-styrene-acrylates, acrylonitrile-butadiene-styrenes, acrylonitrile-ethylene-styrenes, styrene-acrylonitriles, styrene-maleic anhydrides, nylons, polycarbonates, polybutylene terephthalates, polyethylenes, polypropylenes, polystyrenes, polyurethanes, polyvinyl chlorides, acrylics, and mixtures thereof.

13. A method in accordance with claim 6, wherein said binder is a thermoplastic selected from the group consisting of: acrylonitrile-styrene-acrylate copolymers; acrylonitrile-butadiene-styrene copolymers; acrylonitrile-ethylene-styrene copolymers; polyvinyl chloride; blends of polycarbonate and acrylonitrile-butadiene-styrene copolymers in the ratio of about 5:95 to about 95:5 weight percent; blends of acrylonitrile-butadiene-styrene copolymers and nylon in the ratio of about 5:95 to about 95:5 weight percent; blends of polycarbonate and acrylonitrile-styrene-acrylate copolymers in the ratio of about 5:95 to about 95:5 weight percent; blends of polyvinyl chloride and acrylonitrile-styrene-acrylate copolymers in the ratio of about 20:80 to about 80:20 weight percent; and blends of acrylonitrile-styrene-acrylate copolymers and acrylonitrile-ethylene-styrene copolymers in the ratio of about 20:80 to about 80:20 weight percent.

14. A method in accordance with claim 11, wherein said particles of said color-containing system are of from about −10 to about +5000 U.S. Standard mesh size.

* * * * *